United States Patent [19]
Hirano

[11] 3,866,167
[45] Feb. 11, 1975

[54] DEVICE FOR COMPELLING RIDERS TO WEAR SEAT BELTS ON AUTOMOBILES

[75] Inventor: Katsumi Hirano, Nagoya, Japan

[73] Assignee: Kabushiki-Kaisha Tokai-Rika-Denki-Seisakusho, Nishikasugai-gun, Aichi-pref., Japan

[22] Filed: May 29, 1973

[21] Appl. No.: 364,641

[30] Foreign Application Priority Data
June 1, 1972  Japan.................................. 47-54662

[52] U.S. Cl........... 340/52 E, 180/82 C, 307/10 SB, 340/278
[51] Int. Cl. .......................... B60q 9/00, B60r 21/10
[58] Field of Search ....... 340/52 E, 278; 307/10 SB; 180/82 C; 280/150 SB

[56] References Cited
UNITED STATES PATENTS
2,824,293  2/1958  Meinhardt.......................... 340/52 E
3,074,055  1/1963  Rudolph............................ 340/52 E FOREIGN PATENTS OR APPLICATIONS
944,045  12/1963  Great Britain ................ 200/150 SB Primary Examiner—John W. Caldwell
Assistant Examiner—Joseph E. Nowicki

[57] ABSTRACT

A device for compelling riders to wear seat belts in automobiles, in which a keyhole blocking means covering the keyhole of an ignition switch is provided and said keyhole blocking means is displaced automatically by wearing of the seat belts on the riders to open said keyhole.

2 Claims, 3 Drawing Figures

PATENTED FEB 11 1975 3,866,167

DEVICE FOR COMPELLING RIDERS TO WEAR SEAT BELTS ON AUTOMOBILES

The present invention relates to a device for compelling riders to wear seat belts in automobiles. In the event the driver and riders do not wear the seat belts, a key can not be inserted into a keyhole of the ignition switch to start the engine.

Generally, the wearing of the seat belts in an automobile could not be effected without making the rider aware that the wearing of the seat belt is not practised by him.

The present invention makes it possible to compulsorily cause the riders to wear the seat belts by disposing keyhole blocking means obstructing the insertion of a key into the keyhole of the ignition switch when the rider does not wear his seat belt.

An object of the present invention is to provide a device for compelling riders to wear seat belts in automobiles which comprises a keyhole blocking means movable between the position covering the keyhole of an ignition switch and another position opening said keyhole, means keeping said keyhole blocking means at said other position when the riders wear the seat belts and means moving said keyhole blocking means to the position where the keyhole is covered when the riders wear no seat belts, and means for controlling said obstructor automatically in accordance with the wearing of seat belts, so that any accidents due to the non-use of the seat belts can be prevented.

Another object of the present invention is to provide a device for compelling riders to wear seat belts in automobiles, in which the keyhole blocking means to the keyhole is displaced from a retracted position to a keyhole covering position by an electromagnetic solenoid means and is retracted to the position opening the keyhole by a biasing means such as an expansion spring when the electromagnetic solenoid is de-energized by the wearing of seat belts by riders, so that the riders are compelled to wear the seat belts for safety driving.

Other objects and features of the present invention will be clear from the description of the embodiment referring to the drawing, in which FIG. 1 is a sectional view showing the apparatus for compelling riders to wear seat belts in automobiles;

Figure 1:
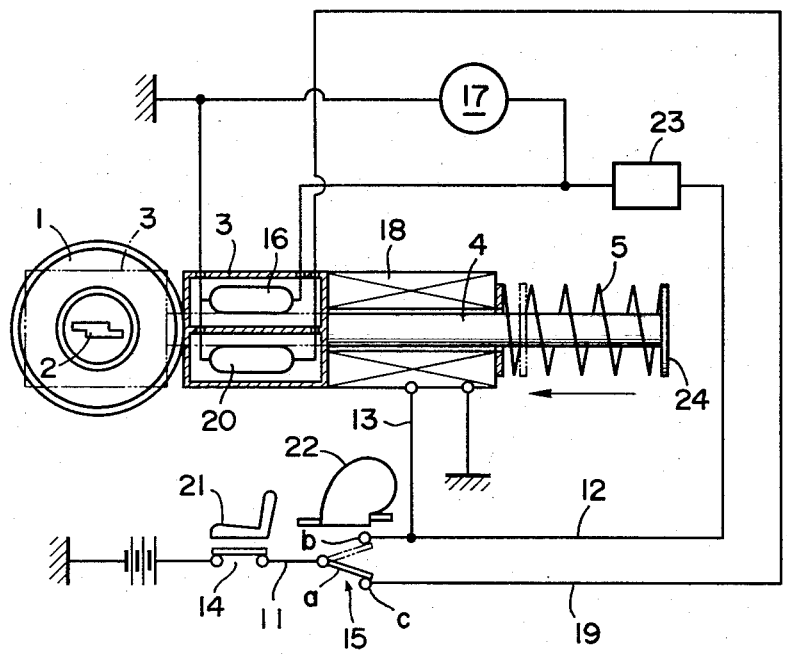
Figure 2:
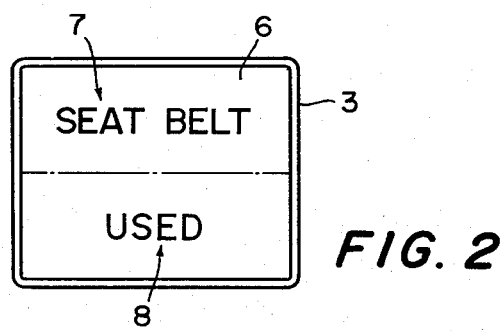
FIG. 2 is a plan view showing an keyhole blocking means to the insertion of a key into the keyhole of the ignition switch of an automobile.

Referring to FIG. 1, an ignition switch 1 has a keyhole 2 at the front surface thereof. A keyhole blocking means 3 is constructed in a box shape which can be moved between a position obstructing the insertion of a key and another position making it possible for the key to be inserted into the keyhole 2. The obstructing position of the keyhole blocking means 3 is shown by a dotted line.

An armature rod 4 is secured to the end of the keyhole blocking means and it extends through an electromagnetic solenoid 18. The armature rod 4 can be moved reciprocally within the electromagnetic solenoid 18, but normally it is shifted to the right-hand position by an expansion spring 5 which is disposed between the one end of the solenoid 18 and a disk 24 secured to the outer end of the rod 4.

The keyhole blocking means 3 comprises lamps 16 and 20 in the inner space thereof and a bright panel 6 such as a semi-transparent glass plate. On the bright panel 6 there are words 7 such as "seat belt" for indicating non-use of the seat belt and a word 8 such as "used" indicating the use of the seat belt. The lamp 16 exposes the words "seat belt" when energized and the lamp 20 exposes the word "used" when energized. These lamps 16 and 20 are connected to a non-used seat belt condition detecting circuit 11.

Figure 3:
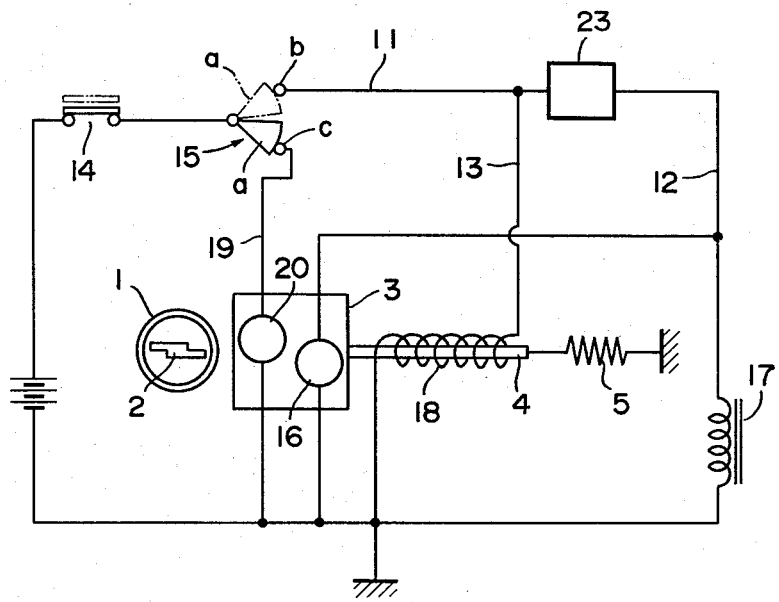
FIG. 3 is an electric circuit diagram used in the apparatus shown in FIG. 1.

Referring to FIGS. 1 and 3, the detecting circuit 11 comprises a seat switch 14 and a change-over switch 15 in series. The seat switch 14 is closed when the rider sits on a seat 21. The change-over switch 15 has a movable contact $a$ and stationary contacts $b$ and $c$. The movable contact $a$ is connected to the detecting circuit 11 and the stationary contact $b$ is connected to a warning circuit 12 and a solenoid circuit 13, and the contact $c$ is connected to a circuit 19. The movable contact $a$ is in contact with the stationary contact $b$ when the seat belt is not used i.e. it is not drawn out from a retractor 22. When the belt is worn by the rider, the movable contact $a$ will be contacted with the stationary contact $c$. The warning circuit 12 comprises a flasher lamp 23, a buzzer 17 and a warning lamp 16. To the circuit 19 solenoid circuit 13 is connected in parallel and the lamp 20 is connected in series.

The operation of the apparatus is described hereinafter. When the rider (includes a driver) sits down on the seat, the switch 14 is closed. At this time, if the rider does not draw out the seat belt from the retractor 22 and wear it, the movable contact $a$ will be in contact with the stationary contact $b$. In this condition, the solenoid circuit 13 is connected with the detecting circuit 11 and the solenoid is energized by a battery through the detecting circuit 11. When the solenoid 18 is energized, the armature rod 4 moves towards the left against the spring 5 so that the keyhole blocking means 3 is moved by the armature rod 4 so as to cover the keyhole 2 as shown by the dotted line in FIG. 1. At the same time the circuit 12 is energized by the battery, so that the flasher lamp 23 and the buzzer 17 call upon the rider to wear the seat belt and the lamp 16 exposes the words 7 on the bright panel 6 to warn the rider of the non-use of the seat belt.

According to the warning due to the flasher lamp 23, the buzzer 17 and the words 7, if the rider draws out the seat belt from the retractor 22 and wears it, in the switch 15 the movable contact $a$ will be in contact with the stationary contact $c$ to close the circuit 19 and to open the circuit 12. Thus, the solenoid 18 is de-energized so that the armature rod 4 is retracted to the right-hand position by the spring 5 and this results in the removal of the keyhole blocking means 3 from the ignition switch 1. Therefore, the rider (or driver) can insert the key into the keyhole 2 to start the engine. In this condition, the lamp 20 exposes the word 8 indicating the use of the seat belt on the panel 6.

As is clear from the above-mentioned description, when even any one of several riders in an automobile car does not wear the seat belt, the keyhole of the ignition (starting) switch is covered with the keyhole blocking means, so that the driver can not insert the key into the keyhole. Therefore, the riders are compelled to the use of the seat belts and the driver can know whether all riders have worn the seat belts or not. Further, the flasher lamp and the buzzer, in the illustrated embodiment, warn the driver that any one of the riders does not wear his seat belt. Thus, accidents due to the non-use of the seat belt can be prevented.

I claim:

1. A device for compelling riders to wear seat belts in automobiles comprising a keyhole blocking means movable between keyhole blocking and opening positions relative to a keyhole of an ignition switch, an armature rod fixed to one end of the keyhole blocking means, an electromagnetic solenoid coil movably supporting the armature rod, the armature rod being movable through the electromagnetic solenoid coil, a spring normally biasing the keyhole blocking means to the keyhole opening position when the solenoid coil is not energized, two lamps disposed in the keyhole blocking means, one of the lamps being for showing a condition where a rider is not wearing a seat belt, the other lamp being for showing a condition where the rider wears the seat belt, a seat switch operably associated with the driver's seat and movable to closed position when the driver sits down on the seat, a change-over switch having a movable contact and two stationary contacts, a circuit including the seat switch, said other lamp, the movable contact and one of the stationary contacts of the change-over switch in series, a detecting circuit including the other stationary contact of the change-over switch and the electromagnetic solenoid coil in series and being connected to the seat switch through the movable contact of the change-over switch in series, and a warning circuit including said one lamp connected to the detecting circuit in parallel.

2. A device for compelling riders to wear seat belts in automobiles according to claim 1, wherein the electromagnetic solenoid coil is secured to the body of an automobile, one end of the armature rod being extended outside of the electromagnetic solenoid coil, the spring being disposed between said one end of the armature rod and the electromagnetic solenoid coil, and the keyhole blocking means being fixed to the opposite end of the armature rod and disposed between the keyhole and the electromagnetic solenoid coil.

* * * * *